United States Patent Office 2,869,521
Patented Jan. 20, 1959

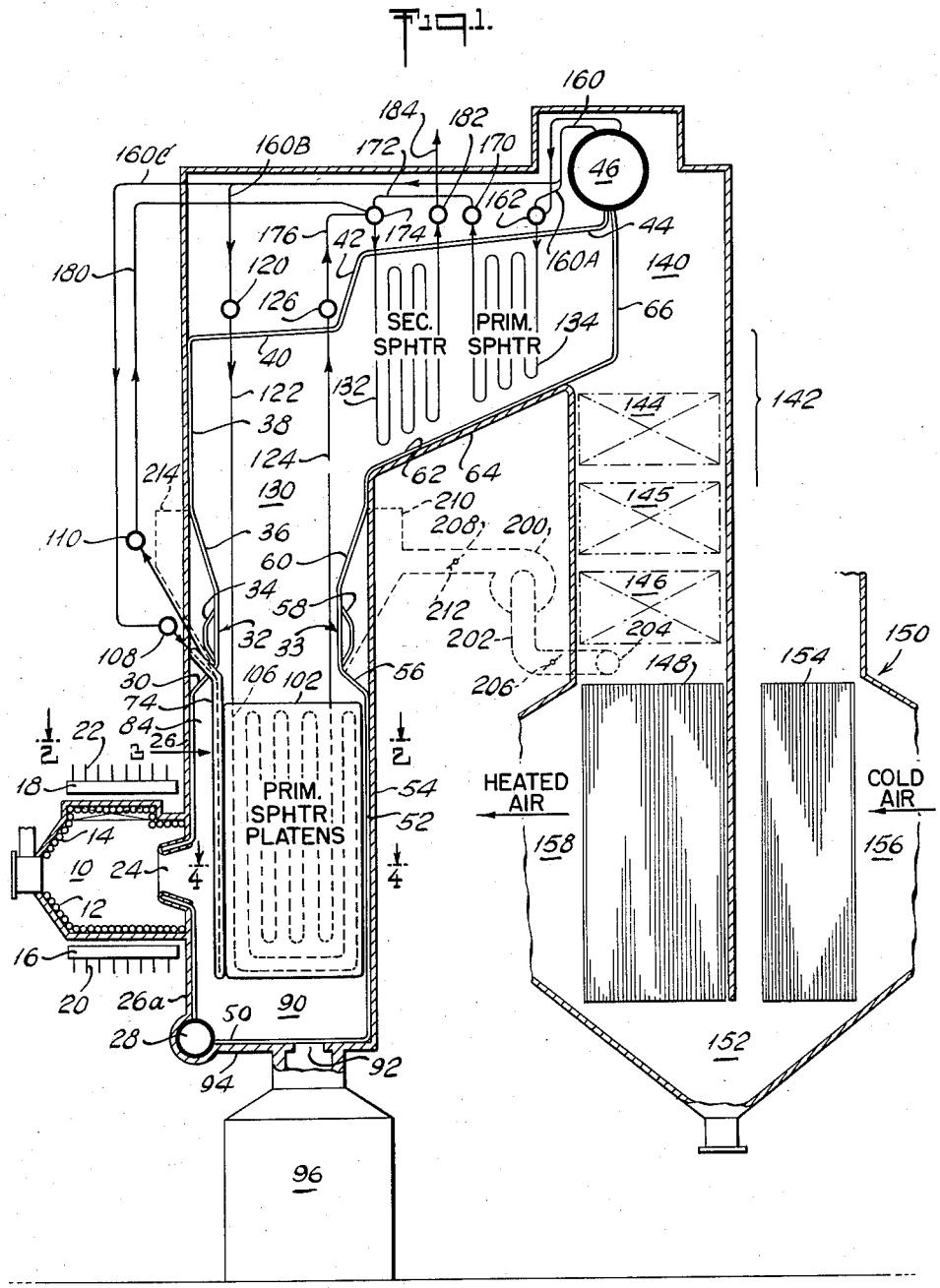

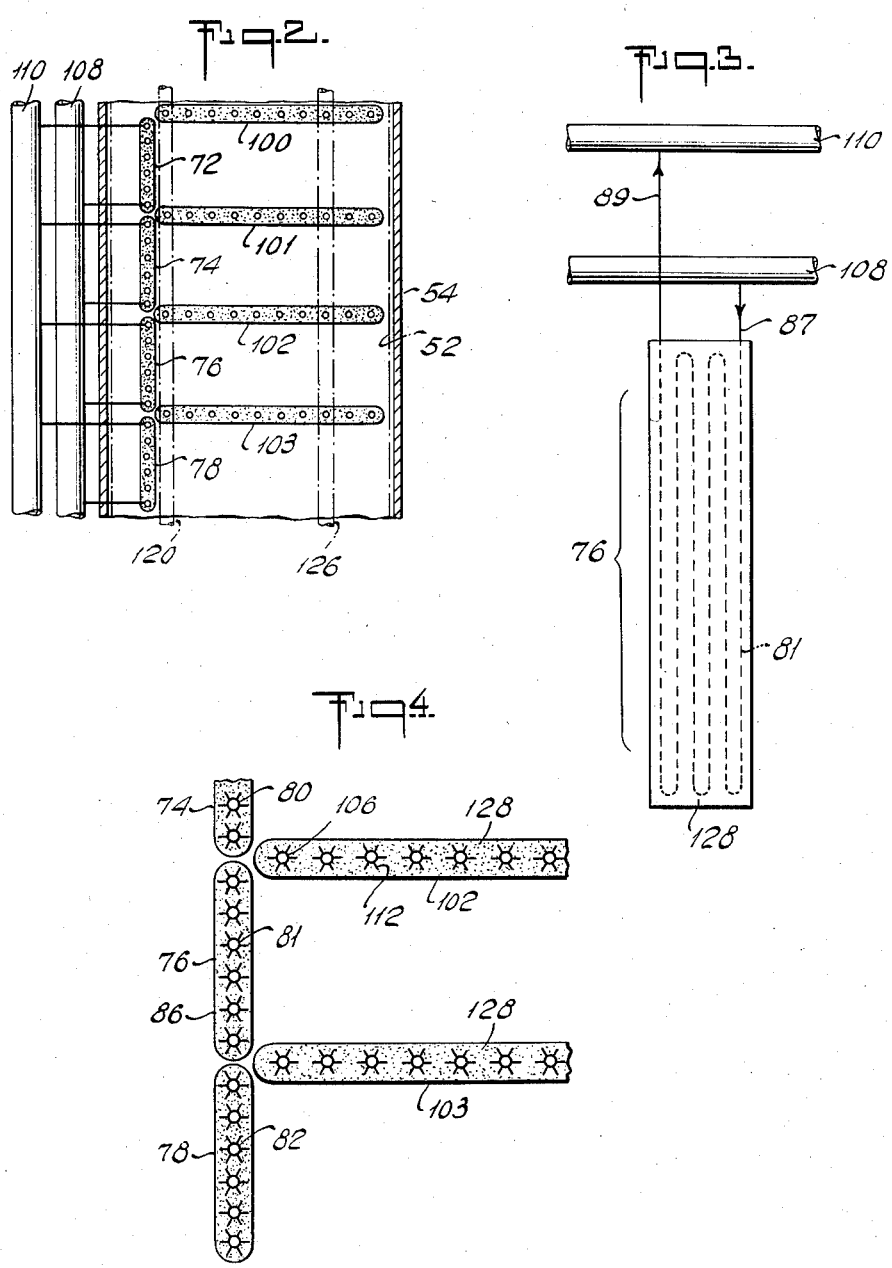

2,869,521

APPARATUS FOR GENERATING AND SUPERHEATING STEAM

Ralph M. Hardgrove, North Canton, Ohio, assignor to The Babcock & Wilcox Company, New York, N. Y., a corporation of New Jersey Application March 16, 1955, Serial No. 494,740

8 Claims. (Cl. 122—481)

This invention relates to the superheating of high pressure steam to high temperatures by the radiant transmittal of heat to confined streams of high pressure steam from furnace gases and their suspended slag particles at high temperatures well above the fusion temperatures of the slag particles. The gases with their suspended particles in a liquid or semi-liquid state are emitted from means burning a slag forming fuel at the pertinent temperatures, within the range of 2300° F. to 3000° F. Such radiant heat transmission is effected in a steam generating and superheating unit in which widely spaced platens of refractory covered superheater tubes are disposed within a zone of temperatures well above the fusion temperatures of the slag. In the steam generating and superheating unit the gases and their suspended particles are subjected to a gas cooling action in a zone downstream in a gas flow sense from the radiant superheating zone. After the gases and their suspended particles are cooled to such a temperature that the suspended particles are not in a sticky condition, heat is convectionally transmitted from the gases and their suspended particles in a convection superheating zone. Thus, the invention promotes the attainment of high temperature steam superheats of the order of 1100 degrees F., in a unit of high availability due to the effecting of radiant heat transmission for superheating the steam in a zone in which the slag particles are maintained in such a liquid or semi-liquid state that they may be readily and reliably removed from the radiant steam superheating elements. Because the fused slag particles are maintained in a uniform state of fusion in the radiant steam superheating zone, the invention also promotes a high degree of uniformity of superheating in that zone.

The slag particles are maintained in their molten or semi-liquid condition in a radiant superheating zone by disposing widely spaced and refractory covered radiant superheater platens in a high temperature gas zone.

The invention also provides a unit characterized by a high degree of availability, resulting from the cooling of the gases and their suspended solid particles to a temperature at which they will not be in such sticky condition as to reduce the availability of that unit because of the fouling of the elements of the convection superheater.

The invention also, in one of its more specfiic aspects, involves the cooling of the heating gases in their suspended particles in a zone intermediate the radiant steam superheating zone and the convection steam superheating zone in such a manner that steam superheat temperatures may be maintained at a predetermined value or values over a wide range of rates of vapor or steam generation.

The invention will be concisely set forth in the claims appended hereto, but for a more complete understanding of the invention, its advantages and uses, recourse should be had to the following description which refers to the accompanying drawings in which a preferred embodiment of the apparatus of the invention is disclosed.

In the drawings:

Fig. 1 is a diagrammatic view in the nature of a side sectional elevation of a high temperature and high pressure steam generating and superheating unit;

Fig. 2 is a fragmentary horizontal section on the line 2—2 of Fig. 1, showing the arrangement of the radiant steam superheater panels or platens in the high temperature zone adjacent a cyclone furnace;

Fig. 3 is a diagrammatic view in the nature of fragmentary elevation showing one of the radiant steam superheater panels or platens disposed in the plane of a target wall facing the gas outlet of the cyclone furnace; and Fig. 4 is a fragmentary horizontal section on the line 4—4 of Fig. 1, indicating the arrangement of the radiant steam superheater panels or platens of the target wall and indicating the superheater platens or panels extending normally to that plane.

The high temperature heating gases for the Fig. 1 unit are supplied by fuel burning means represented by the cyclone furnace 10, lined with vapor generating tubes 12 and 14. These tubes are appropriately connected into the fluid system of the unit by a system including the headers 16 and 18, and the tubes 20 and 22. The tubes lining the cyclone furnace are preferably fully studded tubes covered with high temperature refractory upon their furnace sides, and the cyclone furnace is otherwise constructed and operates in a manner indicated in the U. S. Patent to Kerr et al. 2,594,312 of April 29, 1952.

The high temperature combustion gases exit from the cyclone furnace through the throat 24, extending through the wall 26, which is lined by vapor generating tubes extending upwardly from the lower drum or header 28 along the lower portion 26a of the wall 26, around the throat 24 and then along the succeeding part of the wall 26 to a position at which the tubes are bent inwardly as indicated at 30 to form the lower portions of the arch 32. Thence the tubes lead upwardly past the front of the arch with some of the tubes having the portions 34 bent out of their arch forming alignment to form openings through which recycled gases are projected into the gas stream. Above these openings the tubes have the bent portions 36 through which they return to the vertical alignment of the wall 26. Along this wall the tubes have the vertical portions 38 extending to the roof of the vertically elongated portion of the gas flow path, this roof being outlined by the roof portions 40 of the vapor generating tubes. From these tubular portions the tubes continue through the sharply inclined portions 42 and the other roof sections 44 to appropriate connections with the steam and water mixture receiving chamber of the drum 46.

Other vapor generating tubes lead from the header or drum 28 through the floor tube sections 50 and the upright vapor generating wall tube sections 52 disposed along the right hand wall 54. Intermediate the height of this wall the tubes have portions 56, 58 and 60 corresponding to similar portions of the inwardly extending arch 32 along the opposite side of the gas flow path.

Beyond the section 60 the tubes lead through the inclined tube sections 62 along the inclined wall 64 forming the bottom of the convection superheater pass of the unit. Beyond this wall the tubes lead through the upright sections 66 to appropriate connection with the steam and water mixture space of the drum 46.

It will be understood that the remaining walls of the vertically elongated construction forming a part of the gas flow path similarly include upright vapor generating tubes appropriately connected into the fluid system of the unit.

When coal is burned as a fuel in the cyclone furnace 10, the gases exit through the outlet throat 24 of the cyclone at temperatures within the range of 3000° F. to 3300° F, The exiting gases with suspended particles of slag at temperatures well above the fusion temperature of the slag flow against a target wall which consists of a plurality of upright platens or panels 72, 74, 76 and 78 (see Fig. 2) of refractory covered radiant superheater tubes 80—82 (see Fig. 4). These platens or panels of radiant superheater tubes are aligned transversely of the unit so as to form, with the lower part of the wall 26, the upper part 84 of a primary furnace chamber.

In operation, the refractory covering 86 of the radiant superheater tubes of the target wall is maintained at a temperature well above the fusion temperature of the slag particles so that these particles, in a molten and liquid condition will flow downwardly along the target wall to the lower part 90 of the primary furnace chamber, and thence through the opening 92 in the slag tap floor 94, to the slag pit 96.

Each of the platens 74, 76 and 78 consists of a plurality of series connected tube sections such as 81 with each platen having an inlet section 87 receiving steam from an inlet header 108 and an outlet section 89 conducting steam to an outlet header 110, as indicated in Fig. 3.

From the lower part 90 of the primary furnace chamber the gases, still at temperatures within the range of 2500 degrees F. to 3000 degrees F., flow upwardly between parallel upright platens or panels of radiant superheater tubes, such panels being indicated at 100—103 in Fig. 2. Each platen consists of a plurality of upright parallel tubular sections, such as 106, connected in series as indicated in Fig. 3 for steam flow from the radiant superheater inlet header 120 through the inlet tube 122 and through the outlet tube 124 to the radiant superheater outlet header 126. Each tubular section of each platen has a multiplicity of radially arranged metallic studs 112 welded thereto, and the aligned tubes of each platen, as well as their studs, are completely covered by high temperature refractory material 128 to complete the platen structure.

The radiant superheater platens 100—103 are widely spaced transversely of the unit, preferably upon centers which are from 18 inches to 24 inches apart. The gases passing between the successive radiant superheater platens have their temperatures reduced but not below the previously specified temperature range, well above the fusion temperature of the slag particles suspended in the gases. The refractory material 128 is therefore normally maintained at a temperature of the order of the fusion temperature of the suspended slag particles so that any such particles contacting the surfaces of the platens will run freely down the upright surfaces of the platens in a molten or liquid condition, to exit from the unit in the same manner as the molten slag particles passing downwardly from the target wall, including the primary radiant superheater sections 72, 74, etc.

Beyond the radiant superheater zone, in a gas flow sense, the pertinent wall portions of the unit form the gas cooling chamber 130. Within the cooling zone of this chamber the temperature of the gases is decreased by heat transmittal to the surrounding vapor generating wall tubes and/or by the admixture with the high temperature gases of lower temperature recycled gases passing through the openings in the opposed arches 32 and 33. Concurrent with such reduction in temperature of the gases, the temperature of the slag particles suspended in the gases is reduced below a value at which they would stick to and accumulate upon the successive tubular sections of the bank of tubes 132 constituting a secondary superheater, and the bank of tubes 134 of the primary superheater.

Beyond the primary superheater 134 the gases pass between the spaced tubular sections of the screen 66 into the gas turning space 140 above the downflow convection gas pass 142. In flowing downwardly through this gas pass the gases pass over successively arranged banks 144—146 of economizer tubes and thence through the upright tubes 148 of the air heater 150. Upon exiting from the tubes 148 the gases turn in the hopper 152 and then pass upwardly through the air heater tubes 154 to a stack. In the operation of the air heater, the air to be heated passes from the air inlet 156 transversely of and between the tubes 154 and then through a second pass transversely of and between the tubes 148 to the air outlet 158. From this outlet the gases pass to the fuel burning means of the unit.

The steam and water drum 46 preferably has a plurality of cyclone type steam and water separators arranged therein in a manner indicated in the U. S. patent to Fletcher et al. 2,289,970.

From the steam space at the upper part of the drum 46 the separated steam passes through one or more lines 160. Some of these tubes 160A are directly connected to the inlet header 162 of the bank of tubes constituting the primary superheater 134, and others of the tubes 160B are arranged to conduct steam directly to the inlet header 120 for the radiant superheater platens 100—103. Others, 160C, of these tubes conduct steam to the inlet header 108 for the aligned radiant superheater panels 72, 74, etc. of the target wall facing the cyclone furnace 10.

The tubes of the primary superheater 134, conduct steam to the primary superheater outlet header 170, and thence through the line 172 to the inlet header 174 of the secondary superheater 132.

Steam passing through the tubes 160B to the inlet header 120 and thence through the series connected tubular sections of the radiant superheater platens 100—103 passes from the outlet header 126 through the conduits 176 to the inlet header 174 of the secondary superheater 132.

Saturated steam passing from the drum 46 through the tubes 160C flows to the header 108 and thence through appropriate connections to the series connected tubular components of the radiant superheater panels 74, 76 etc., and then to the outlet header 110. From this outlet header the superheated steam passes through the tubes 180 to the inlet header 174 of the secondary superheater 132.

From the outlet header 182 of the secondary superheater 132 the superheated steam passes through the lines 184 to a point of use.

The superheating effect of the radiant superheater is such that the temperature of the superheated steam would decrease as the vapor generating load increases if all of the superheating were done by the radiant superheater. The convection superheater sections have an opposite effect and the convection superheater surfaces are therefore preferably so proportioned relative to the radiant superheater surfaces that one of the above indicated effects offsets or compensates for the other.

To supply the lowered temperature heating gases for mixture with the high temperature gases in the cooling zone 130, the Fig. 1 unit includes a recycled gas system including a fan 200 having its inlet connected by ductwork 202 with an opening 204 in free communication with the gas flow beyond the economizer, this ductwork including a gas flow control damper 206. The outlet of the fan 200 communicates, by ductwork 208, with a gas distribution chamber 210 extending across the pertinent side of the unit with the coextensive recycled gas outlets formed by bending alternate arched tubes out of their wall alignment, gas flow through duct 208 being controlled by the damper 212. A branch conduit similar to 208 and communicating therewith, extends around the side of the cooling chamber 130 to connect with a gas distribution chamber 214, similar to the chamber 210 and communicating with the openings in the face of the arch 32 formed by the bending of alternate vapor generating tube parts 34 out of their arch forming alignment.

As the demand for generated vapor, and the rate of fuel firing increases, the flow of recycled gases is likewise increased for mixture with the higher temperature gases in the cooling chamber 130 in order that the suspended slag particles may be in such condition that they do not adhere to and accumulate upon the tubes of the convection superheater sections 132 and 134.

Whereas, the invention has been described with reference to the preferred embodiment of the apparatus thereto it is to be understood that the invention is not limited to all of the details thereof. It is rather to be taken as of a scope commensurate with the scope of the subjoined claims.

I claim:

1. In a high pressure and high temperature steam generating and superheating unit; means including fluid conducting wall tubes defining a confined gas flow path leading from a fuel burning zone through a radiant steam superheating zone and then through a gas cooling zone to a convection steam superheating zone; some of the said fluid conducting tubes being upright vapor generating wall tubes forming a vertically elongated part of the gas flow path; means burning a slag forming fuel at temperatures well above the fusion temperatures of the slag and delivering the combustion products including fused slag particles to the lower part of said vertically elongated portion of the gas flow path; refractory covered platens of radiant superheater tubes disposed within the lower part of said vertically elongated portion of the gas flow path and immediately adjacent the fuel burning zone, with some of said platens combining with the vapor generating wall tubes to form a primary furnace chamber in the fuel burning zone; others of the refractory covered radiant steam superheater platens being disposed in upright planes and widely spaced in a radiant steam superheating zone at the lower part of said vertically elongated portion of the gas flow path; means associated with the gas cooling zone disposed above the radiant steam superheating zone and within the upper part of the intermediate portion of the gas flow path formed by said upright vapor generating tubes for reducing the temperature of the gases exiting from the radiant steam superheating zone; said last named means including parts of the vapor generating wall tubes and a gas recirculation system introducing into the gas cooling zone lower temperature gases; a bank of convection steam superheating tubes disposed across the gas flow in a convection steam superheating zone beyond the gas cooling zone in a gas flow sense; and means for conducting the generated steam to the superheater tubes.

2. In a steam generating and superheating unit; a cyclone furnace normally burning a slag forming fuel at temperatures within the range of 2300° F. to 3000° F. well above the slag fusion temperature; means including steam generating wall tubes defining a confined gas flow path leading from the fuel burning zone through a radiant steam superheating zone and then through a gas cooling zone to a convection steam superheating zone; a radiant superheater section including a plurality of upright panels or platens of parallel superheater tubes covered with a high temperature refractory and disposed within a high temperature zone adjacent the gas outlet of the fuel burning means; at least one of the radiant superheater platens constituting a part of a target wall facing the gas outlet of the cyclone furnace and combining with the steam generating wall tubes to define a primary furnace chamber in direct communication with the gas outlet of the cyclone furnace; others of the radiant superheater platens being widely spaced in parallelism in the direction of gas flow from the primary furnace chamber; a bank of convection steam superheater tubes disposed transversely of the flow of gases originating in the cyclone furnace at a position spaced substantially downstream in a gas flow sense from the radiant superheating zone; said gas flow path forming means constructed and arranged to provide a gas cooling zone intermediate the primary radiant steam superheating zone and a convection steam superheating zone; means for withdrawing a controlled proportion of the combustion gases from a position in the gas flow path downstream of the convection superheating zone, and introducing the withdrawn gases as tempering gases into the gas cooling zone; opposite parts of said gas flow path forming means including the steam generating wall tubes and forming inwardly directed opposing arches at a position in the gas flow path just beyond the radiant steam superheating zone; said lower temperature heating gas introduction means arranged to have its gas outlets disposed through walls of the gas flow path at the opposing mid portions of said arches; and means for conducting the generated steam to the superheater tubes.

3. In a high pressure and high temperature steam generating and superheating unit, means including a cyclone furnace for burning a slag forming fuel at temperatures above the fusion temperature of the slag, a predominantly radiantly heated steam superheater subject to radiant heat from the products of combustion from the cyclone furnace, a convection superheater including spaced tubes extending across the flow of gases originating in the cyclone furnace and disposed downstream in a gas flow sense from the radiant superheater, means including steam generating wall tubes defining a confined gas flow path leading from the fuel burning zone through the radiant steam superheating zone and then through a gas cooling zone to the convection steam heating zone, the radiant superheater having a panel ceramic covered spaced superheater tubes constituting a primary furnace chamber wall facing and in impacting relationship to the combustion products discharged from the cyclone furnace and combining with some of the steam generating tubes to form a primary furnace chamber between the gas cooling zone and the cyclone furnace, means including parts of some of the steam generating tubes constituting a slag tap floor of the unit, the radiant superheater having other ceramic covered tubes disposed in panels widely spaced transversely of gas flow and extending in parallelism in the direction of gas flow, said last named radiant superheater panels being disposed upstream of the cooling zone in a gas flow sense, and means whereby the steam generated in the wall tubes flows through the convection superheater and the radiant superheater.

4. In a high pressure and high temperature steam generating and superheating unit, a cyclone furnace burning a slag forming fuel at temperatures above the fusion temperature of the slag, a predominantly radiantly heated steam superheater subject to radiant heat from the products of combustion from the cyclone furnace, a convection superheater including spaced tubes extending across the flow of gases originating in the cyclone furnace and disposed downstream in a gas flow sense from the radiant superheater, means including steam generating wall tubes defining a confined gas flow path leading from the fuel burning zone through the radiant steam superheating zone and then through a gas cooling zone to the convection steam heating zone, the radiant superheater having one or more platens or panels of spaced superheater tubes constituting a primary furnace chamber wall facing the exit of combustion products from the cyclone furnace and combining with some of the steam generating tubes to form a primary furnace chamber between the gas cooling zone and the cyclone furnace, means including parts of some of the steam generating tubes constituting a slag tap floor of the unit, the radiant superheater having other tubes disposed as panels or platens widely spaced transversely of gas flow and extending in parallelism in the direction of gas flow, said last named radiant superheater panels or platens being disposed upstream of the cooling zone in a gas flow sense, all of the radiant superheater tubes of each platen having metallic extensions welded thereto with all of the studs and their tubes covered by high temperature refractory, and means whereby the steam generated in the wall tubes flows through the convection superheater and the radiant superheater.

5. In a high pressure and high temperature steam generating and superheating unit, means including steam generating wall tubes defining a furnace chamber, means burning a slag forming fuel at temperatures above the fusion temperature of the slag and having an outlet for the discharge of hot gaseous products of combustion and entrained molten slag into the lower portion of said furnace chamber to thereby furnish the heat to be absorbed by the unit, a predominantly radiantly heated steam superheater subject to radiant heat from the products of combustion from the fuel burning means, a convection superheater including spaced tubes extending across the flow of gases from the fuel burning means and disposed downstream in a gas flow sense from the radiant superheater, means including the steam generating wall tubes defining a confined gas flow path leading from the fuel burning zone through the radiant superheating zone and then through a gas cooling zone to the convection steam heating zone, the gas cooling zone being formed at least in part by the steam generating wall tubes at a position between the radiant superheater and the convection superheater, the radiant superheater having upright platens disposed at least in part below the outlet of the fuel burning means so as to be subject to the flow of the high temperature combustion gases and their suspended molten slag particles, a highly heat resistant refractory covering for the superheater panels to maintain the slag accumulating on the panels in a flowing condition, means providing for the exit from the furnace chamber of slag flowing from the superheater panels, and means whereby steam generated in said wall tubes is conducted to and through the superheater tubes.

6. In a high pressure and high temperature steam generating and superheating unit, means including steam generating wall tubes defining a furnace chamber, means burning a slag forming fuel at temperatures above the fusion temperature of the slag and thereby furnishing the heat to be absorbed by the unit, a predominantly radiantly heated steam superheater subject to radiant heat from the products of combustion from the fuel burning means, a convection superheater including spaced tubes extending across the flow of gases from the fuel burning means and disposed downstream in a gas flow sense from the radiant superheater, means including the steam generating wall tubes defining a confined gas flow path leading from the fuel burning zone through the radiant superheating zone and then through a gas cooling zone to the convection steam heating zone, the gas cooling zone being formed at least in part by the steam generating wall tubes at a position between the radiant superheater and the convection superheater, the radiant superheater having one or more upright platens or panels disposed immediately adjacent and facing the fuel burning means so as to be subject to the initial flow and impact of the high temperature combustion gases and their suspended molten slag particles, a highly heat resistant refractory covering for the superheater panels whereby slag accumulating on the panels is maintained in a flowing condition, means providing for the exit from the furnace chamber of slag flowing from the superheater panels, and means whereby steam generated in said wall tubes is conducted to and through the superheater tubes.

7. Apparatus for generating and superheating high pressure vapor comprising walls defining a furnace having an outlet for discharge of hot gaseous products of combustion therefrom, means for cooling the walls of said furnace including vapor generating tubes therein, burner means for introducing ash-containing fuel and combustion air into a portion of said furnace remote from said hot gaseous product outlet for combustion of the fuel at temperatures above the fusion temperature of the ash, a target wall at one side of said furnace opposite said burner means and in impinging relationship to the hot combustion gases and entrained molten ash particles discharged from the outlet of said furnace, said target wall including refractory covered vapor superheating tubes, and means forming a molten ash outlet from said furnace and positioned in molten ash receiving relationship to said target wall.

8. Apparatus for generating and superheating high pressure vapor comprising a cyclone furnace of circular cross-section having a restricted throat at one end thereof for the discharge of hot gaseous products of combustion therefrom, means for introducing ash-containing fuel and combustion air into said furnace at high velocity for combustion of the fuel at temperatures above the fusion temperature of the ash, means for cooling the walls of said cyclone furnace including vapor generating tubes, a primary furnace defined in part by vapor generating tubes and disposed in hot gas receiving relationship to the throat of said cyclone furnace, and a target wall at one side of said primary furnace opposite and substantially normal to the axis of said throat and in impinging relationship to gases and entrained molten ash discharged from said cyclone throat, said target wall including refractory covered vapor superheating tubes.

References Cited in the file of this patent

UNITED STATES PATENTS

| | | |
|---|---|---|
| 2,267,027 | Hardgrove | Dec. 23, 1941 |
| 2,685,279 | Caracrist | Aug. 3, 1954 |

FOREIGN PATENTS

| | | |
|---|---|---|
| 675,410 | Great Britain | June 9, 1952 |
| 688,585 | Great Britain | Mar. 11, 1953 |
| 1,061,095 | France | Nov. 25, 1953 |